June 10, 1930.  R. J. MacDUFFEE ET AL  1,762,448

HEATER AND STERILIZER

Filed June 11, 1929

INVENTORS:
Robert J. MacDuffee
BY George W. Young
J. R. Rives,
ATTORNEY

Patented June 10, 1930

1,762,448

UNITED STATES PATENT OFFICE

ROBERT J. MacDUFFEE AND GEORGE W. YOUNG, OF SEATTLE, WASHINGTON

HEATER AND STERILIZER

Application filed June 11, 1929. Serial No. 370,110.

This invention relates to improvements in devices for heating water and providing steam for sterilization purposes, and in particular the heating of water for dairymen, or the like, to whom, under usual conditions, a supply of hot water is not readily available, and for sterilizing articles used in dairying, such as bottles, milk pails and other utensils.

One of the objects of the invention is, to provide a tank, supported by a crate-like and insulated frame, wherein an electric heater of the immersion and open circuit type is utilized as a heating device.

Another object is, to afford a cover for the tank which may be made to assume a completely open position in a handy way and without disconnecting it from the rest of the device, the cover when initially opened being designed to act on a switch which cuts off the supply of electric current to the heater, the instrumentalities provided and cooperating with the cover rendering it convenient and sanitary in operation and also serving to economize the use of said current.

A further object is, to provide in a device of this class a construction which is simple and relatively light in weight.

Additional objects, capabilities and advantages will appear as the description of the invention progresses.

In the accompanying drawing—

Figure 4:
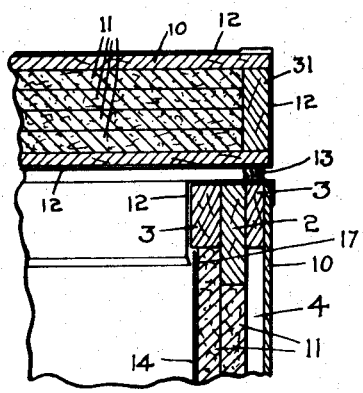
Fig. 4 is an enlarged detail sectional view of portions of the container and cover.
Figure 5:
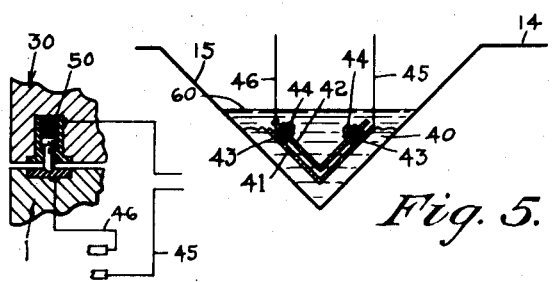
Fig. 5 is a diagrammatical sectional view, indicating a trough of the tank, V-shaped in cross section, the electric heater disposed therein and means for establishing an electric circuit through said heater.

What we term the container of the device, and which is generally denoted as 1, includes a frame, insulating material disposed exteriorly and interiorly of the frame, and a tank enclosed thereby. Said frame 2 is preferably of wood construction, rectangular in outline and having the general form of a crate, its upper edge portions being increased in thickness, as at 3, Fig. 4, which imparts to it more rigidity, and its construction obviously provides interspaces between the slats thereof, said interspaces being designated as 4. It is also provided in its lower portion with a foundation structure 5 for said tank having a pair of supports 6, disposed in spaced parallel relation, and the purpose of which will presently appear.

The exterior portions of the frame are covered with fiber board 10, and in the present embodiment of the invention sheets of insulating board 11, double in thickness, are laid on said foundation structure as the same extends on each side of said pair of supports, and also against the interior of the frame extending thereabove and terminating at the edge portions 3, the interspaces 4 formed by the slats affording enclosed air spaces between the respective boards. An insulating board of the wood fiber type is satisfactory for this purpose, but, as is evident, any other suitable insulating board may be utilized, and the board thus used may be nailed to the slats of the frame or secured in place in any other appropriate manner. Mounted to the edge portions 3 of the frame is a metallic rim 12, which may be of galvanized iron, the said rim extending throughout the upper and exterior edge portions and completely covering said portions interiorly of the container. Said rim carries a gasket 13 which affords a steam-tight connection with the container for a cover to be hereinafter and more particularly described.

A tank 14, preferably made of copper, is provided with a transversely extending trough 15, enclosed at each of its ends and V-shaped in cross section, and said tank is designed to be mounted within and to snugly but slidably fit the insulated frame just described. As it may be noted in Fig. 1, the supports 6 provide a recess 16 to accommodate said trough and they, in connection with the insulating boards laid on the foundation structure 5, serve to support the tank in place. When said tank is in operative position its upper edge portion 17 is intended to be out of contact with the rim 12, as is more clearly shown in Fig. 4. A faucet 18 is located in the bottom portion of the container and insulated electrically from said tank, as at 19, and laid in the bottom of the tank is a support for articles to be treated therein, the support consisting of longitudinal and transverse strips of wood, denoted as 20 and 21 respectively and secured together in the form of latticework. As illustrative of one form of the device, a plurality of milk bottle cases are shown in the tank and seated on said support, the same being designated as 22. Said cases have open tops and are each provided with a network bottom portion, which permit the bottles contained therein to be treated as will be hereinafter described.

Figure 2:
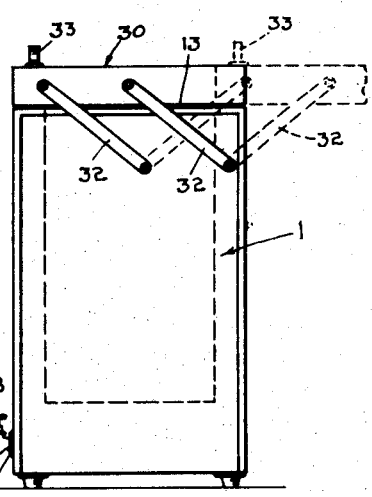
Fig. 2 is an end view of the same, particularly designed to illustrate a pair of parallel bars pivotally connected with each end of the container and cover and through which the cover operates in opening and closing, the positions of said cover and bars when the cover is opened being indicated by dotted lines and the cover now shown as broken away.
Figure 3:
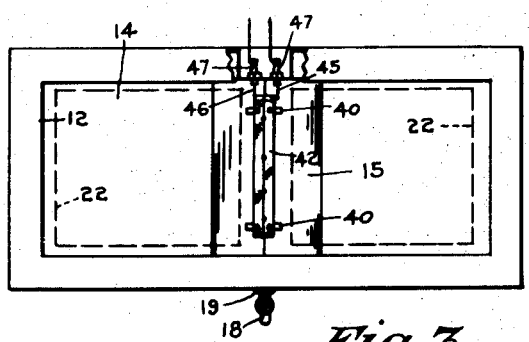
Fig. 3 is a top view of the device with the cover removed, particularly showing the electric heater, portions being broken away to illustrate the electrical connections therefor.

The cover for the device, generally denoted as 30, is complementary in form to the top of the container, and comprises a wood casing 31 filled with layers of the insulating board 11, it being covered on its top portion with the fiber board 10 and on its bottom portion and edge sections with metallic sheet material. Said material is preferably identical with that utilized for the rim 12 of the container and mounted practically in the same way, consequently this metallic sheeting is given a like and general designation, 12. The cover operates in opening and closing on a pair of parallel bars, each denoted as 32 and pivotally secured to the container and to each end of the cover, the cover being manipulated to open or closed positions, indicated in Fig. 2, by the handle 33.

Figure 6:
Fig. 6 is a sectional view of portions of the container and cover, including an enlarged sectional view of said switch and a diagrammatical view of the wiring for operatively connecting the electric heater and the switch.

A V-shaped bracket 40, of any suitable material, is secured to each end and interiorly of the trough 15, the brackets serving to support the electric heater of the device within said trough and insulate it electrically therefrom. Said heater consists of a pair of copper members 41 and 42, V-shaped in cross section and disposed one within the other, the same being spaced apart and insulated by suitable material 43 and also insulated by said material from the screws 44 by which they are attached to said brackets. A wire 45 is connected with the member 41 and a wire 46 is connected with the member 42, said wires communicating with the respective members through water-tight terminals 47 secured in one end of the trough. Said wires are designed to be coupled up electrically with the wires of an electric lighting circuit and which will permit said members to function as electrodes, the wire 46 being secured to and operable through an electric switch 50 of the plunger type mounted in the cover and container, the wiring and switch being more particularly shown in Fig. 6. As is evident, the wire 46 may be housed within the structure in any suitable manner and as may be deemed most desirable. For the purpose of illustrating the operation of the electric heater just described, a quantity of water 60 is shown as contained in said trough.

Figure 1:
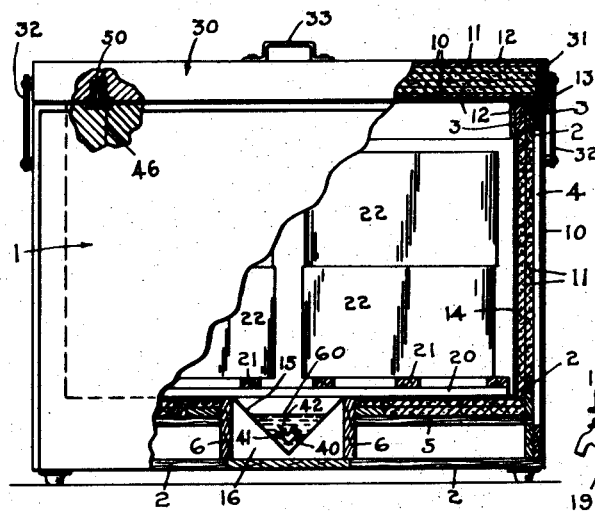
Figure 1 is a front elevation of the device complete, the same being partly broken away and in section to show the construction of the container, the cover therefor, the location of the electric heater, said switch, and a plurality of cases for milk bottles disposed within the tank.

In operating the device, as for instance in sterilizing milk bottles, the cases heretofore described and containing said bottles may be mounted in the tank as shown in Fig. 1. Assuming that a quantity of water has been supplied to the tank which is adequate in amount, that the cover has been closed, and that an electric current has been turned on to the heater, the device is then ready to function. As it may be noted, when there is sufficient water in the trough to connect the two electrodes, the water acts as a medium for establishing an electric circuit through said heater. The water in the tank is then heated by an electric current passing between the electrodes and steam is formed which serves to sterilize the bottles. When the bottles have been sterilized, the cover is lifed and said switch is immediately opened, thereby breaking said circuit and shutting off the supply of electric current to the heater, rendering it safe for the user to come in contact with the tank and preventing a waste of said current. As is evident, when the cover is completely opened, the device is in condition for removal of the cases and contents. As heretofore described, the tank when in operative position is out of contact with the rim 12, which prevents electrical communication from the tank to the rim when the heater is operating.

If, during the operation of the device, the water in the trough should get below the top electrode 42 so as to break the water contact between the electrodes, the current of electricity will obviously be broken and the heater will cease to function, thus automatically protecting the tank against the injury incident to said heater operating in a dry tank and also saving loss of said current. In addition to the functions already ascribed to the heating device, the electrodes are each of a form and so disposed within the trough as to permit them to serve as baffle-plates which deflect the water as it boils and thus facilitate its circulation in the tank.

The cover, through the parts described, may be conveniently opened, it then occupying a place at the side of the container which will permit easy access to the tank and also afford the cover an elevated and sanitary position. It may be closed with equal facility, its closing also acting to close said switch.

The treatment of other articles by steam and for sterilization purposes may be effected in a like manner, and the device is well adapted to provide in a practical way a supply of hot water for extraneous use, the same being drawn through the electrically insulated faucet with which said device is equipped.

We claim:

1. A device of the class described, comprising an insulated supporting structure for a tank, a tank provided in its lower portion with a trough and detachably mounted in said structure, an electric heater of the immersion and open circuit type disposed in the trough, a cover for the supporting structure insulated electrically from the tank, an electric switch located in the cover and said structure, said switch being adapted to be opened by raising the cover and closed by lowering the cover, and means for establishing an electric circuit through the switch and said heater.

2. In a heater and sterilizer, a tank, an electric immersion heater operatively mounted in the tank, a supporting structure for the tank, comprising a frame having spaced slats, heat-insulating material disposed interiorly and exteriorly of the frame adapted to enclose the frame and provide enclosed air spaces between said slats, a rim for the structure isolated from the tank, and a steam-tight heat-insulated cover operative on said rim and pivotally connected with said structure.

3. In a device of the class described having a container, a cover for the container operable in opening and closing on two sets of parallel bars, each set comprising a pair of said bars spaced apart and diagonally disposed relative to the cover and container and pivotally connected with said cover and container.

ROBERT J. MacDUFFEE.
GEORGE W. YOUNG.